(12) United States Patent
Lim et al.

(10) Patent No.: US 12,179,779 B2
(45) Date of Patent: Dec. 31, 2024

(54) APPARATUS FOR CONTROLLING TO COPE WITH FAILURE IN AUTONOMOUS DRIVING SYSTEM AND METHOD THEREOF

(71) Applicants: Hyundai Motor Company, Seoul (KR); Kia Corporation, Seoul (KR); HYUNDAI AUTOEVER Corp., Seoul (KR)

(72) Inventors: Hong Yeol Lim, Incheon (KR); Eun Ho Lee, Seoul (KR)

(73) Assignees: Hyundai Motor Company, Seoul (KR); Kia Corporation, Seoul (KR); HYUNDAI AUTOEVER Corp., Seoul (KR)

( * ) Notice: Subject to any disclaimer, the term of this patent is extended or adjusted under 35 U.S.C. 154(b) by 365 days.

(21) Appl. No.: 17/738,961

(22) Filed: May 6, 2022

(65) Prior Publication Data

US 2023/0092493 A1 Mar. 23, 2023

(30) Foreign Application Priority Data

Sep. 23, 2021 (KR) .................. 10-2021-0125827

(51) Int. Cl.
*B60W 50/02* (2012.01)
*B60W 60/00* (2020.01)
*G06F 11/14* (2006.01)

(52) U.S. Cl.
CPC .... *B60W 50/0225* (2013.01); *B60W 50/0205* (2013.01); *B60W 60/0015* (2020.02); *G06F 11/1458* (2013.01)

(58) Field of Classification Search
CPC ............... G06F 11/1458; B60W 60/00; B60W 60/0015; B60W 50/0205; B60W 50/0225
USPC .......................................................... 714/21
See application file for complete search history.

(56) References Cited

U.S. PATENT DOCUMENTS

| | | | |
|---|---|---|---|
| 9,058,419 | B2 | 6/2015 | Costin et al. |
| 10,983,519 | B2 | 4/2021 | Dobberphul et al. |
| 11,068,360 | B2 | 7/2021 | Geng et al. |
| 2015/0175170 | A1 | 6/2015 | Aoki |
| 2018/0105183 | A1 | 4/2018 | Kollmer |
| 2018/0370540 | A1 | 12/2018 | Yousuf et al. |
| 2019/0056735 | A1* | 2/2019 | Koopman ............... G01C 21/20 |
| 2020/0039530 | A1 | 2/2020 | Smolyansky et al. |
| 2020/0320807 | A1 | 10/2020 | Gorti et al. |
| 2020/0391729 | A1 | 12/2020 | Liu et al. |

(Continued)

FOREIGN PATENT DOCUMENTS

| | | |
|---|---|---|
| EP | 3770765 A | 1/2021 |
| JP | 2015-118662 A | 6/2015 |

(Continued)

*Primary Examiner* — Yair Leibovich
(74) *Attorney, Agent, or Firm* — Morgan, Lewis & Bockius LLP

(57) ABSTRACT

An apparatus of controlling to cope with a failure in an autonomous driving system and a method thereof are provided. The apparatus determines whether a failure in one or more applications for performing a function about autonomous driving occurs and sequentially performs step-by-step failure response control corresponding to a safety rating of the application in which the failure occurs, when the failure in the application occurs. The apparatus stably performs an autonomous driving function.

16 Claims, 7 Drawing Sheets

(56) References Cited

U.S. PATENT DOCUMENTS

| | | | |
|---|---|---|---|
| 2021/0019240 A1 | 1/2021 | Geng et al. | |
| 2021/0024092 A1* | 1/2021 | Han | B60L 58/21 |
| 2021/0109813 A1* | 4/2021 | Morris | G06T 1/20 |
| 2021/0269063 A1 | 9/2021 | Lee et al. | |
| 2021/0295439 A1* | 9/2021 | Konrardy | G05D 1/0212 |
| 2021/0342234 A1 | 11/2021 | Geng et al. | |

FOREIGN PATENT DOCUMENTS

| | | |
|---|---|---|
| KR | 10-2017-0134710 A | 12/2017 |
| KR | 10-2019-0107279 A | 9/2019 |
| KR | 10-2020-0002925 A | 1/2020 |
| KR | 10-2119767 B | 6/2020 |

\* cited by examiner

| SEVERITY | EXPOSURE | CONTROLLABILITY | | |
|---|---|---|---|---|
| | | C1 (Simple) | C2 (Nomal) | C3 (Difficult, Uncontrollable) |
| S1 LIGHT AND MODERATE INJURIES | E1(Very low) | QM | QM | QM |
| | E2(Low) | QM | QM | QM |
| | E3(Medium) | QM | QM | A |
| | E4(High) | QM | A | B |
| S2 SEVERE AND LIFE THREATENING INJURIES- SURVIVAL PROBABLE | E1(Very low) | QM | QM | QM |
| | E2(Low) | QM | QM | A |
| | E3(Medium) | QM | A | B |
| | E4(High) | A | B | C |
| S3 LIFE THREATENING INJURIES, FATAL INJURIES | E1(Very low) | QM | QM | A |
| | E2(Low) | QM | A | B |
| | E3(Medium) | A | B | C |
| | E4(High) | B | C | D | lowest ASIL
Low risk reduction necessary

⋮ highest ASIL
High risk reduction necessary

Fig.3

APPARATUS FOR CONTROLLING TO COPE WITH FAILURE IN AUTONOMOUS DRIVING SYSTEM AND METHOD THEREOF

CROSS-REFERENCE TO RELATED APPLICATION

The present application claims priority to Korean Patent Application No. 10-2021-0125827, filed on Sep. 23, 2021, the entire contents of which is incorporated herein for all purposes by this reference.

BACKGROUND OF THE INVENTION

Field of the Invention

The present disclosure relates to an apparatus of controlling to cope with a failure in an autonomous driving system and a method thereof, and more particularly, relates to an apparatus of coping with when an error in an application of the autonomous driving system occurs and a method thereof.

Description of Related Art

Recently, there has been a tendency that an application of an autonomous driving system is integrated into one integrated controller. When an error in some of various types of applications occurs and when it attempts to recover the applications by a reset of the integrated controller or the like, an application in which the error does not occurs may also be stopped. Furthermore, although an operation system (OS) of the integrated controller is reset in a software step to attempt to perform recovery, the application in which the error does not occur is also stopped.

When all applications about the autonomous driving system are stopped when a failure in some applications about the autonomous driving system occurs, an autonomous driving service may fail to be stably provided. When the autonomous driving service is not stably provided, a driver may fail to trust the autonomous driving system. Thus, there is a demand for developing a technology capable of stably providing an autonomous driving service, when a failure in some applications about autonomous driving occurs, preventing reliability of the user for the autonomous driving system from being degraded, and recovering the failure application.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present disclosure are directed to providing an apparatus of coping with when an error in an application of an autonomous driving system occurs and a method thereof.

Another aspect of the present disclosure provides an apparatus of coping with a failure in an autonomous driving system to stably provide an autonomous driving service and a method thereof.

Another aspect of the present disclosure provides an apparatus of coping with a failure in an autonomous driving system to prevent reliability of a user for the autonomous driving system from being degraded and a method thereof.

Another aspect of the present disclosure provides an apparatus of coping with a failure in an autonomous driving system to respond to a situation where some applications fail, although various autonomous driving applications are integrated into one integrated controller, and a method thereof.

Another aspect of the present disclosure provides an apparatus of coping with a failure in an autonomous driving system to provide a driver with an available service during a longer time, upon a situation when some autonomous driving applications fail, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus of controlling to cope with a failure in an autonomous driving system may include a storage configured for storing information related to a predetermined safety rating for one or more applications which perform a function about autonomous driving and a processor that determines whether a failure in the application occurs and sequentially performs step-by-step failure response control corresponding to a safety rating of the application in which the failure occurs, when the failure in the application occurs.

In an exemplary embodiment of the present disclosure, the processor may reset a portion of the autonomous driving system, associated with the application in which the failure occurs, step by step.

In an exemplary embodiment of the present disclosure, the processor may stop resetting the portion of the autonomous driving system, when the application in which the failure occurs is recovered while resetting the portion of the autonomous driving system step by step and operates normally the application in which the failure occurs.

In an exemplary embodiment of the present disclosure, the processor may sequentially perform the step-by-step failure response control, including a reset for the application in which the failure occurs, a reset for an operation system (OS) about the application in which the failure occurs, and a reset for a controller about the application in which the failure occurs, in a predetermined order.

In an exemplary embodiment of the present disclosure, the processor may back up data for the application in which the failure occurs before performing each reset.

In an exemplary embodiment of the present disclosure, the processor may deliver data before resetting the application in which the failure occurs and an error occurrence code for the failure to another application in which the failure does not occur, when there is a request to deliver data between the application in which the failure occurs and another application while resetting the application in which the failure occurs.

In an exemplary embodiment of the present disclosure, the processor may determine a failure in the one or more applications, based on at least one of whether the application is enabled, whether running of the application is greater than a time limit, a logic execution order, an order of execution of a task with dependence, or whether there is data synchronization.

In an exemplary embodiment of the present disclosure, the processor may reset the portion of the autonomous driving system step by step, depending on the number of resets corresponding to the safety rating.

In an exemplary embodiment of the present disclosure, the processor may record a failure code, when the application in which the failure occurs is not recovered, after performing the step-by-step failure response control, may deliver a maintenance request to a user, and may end a controller about the application in which the failure occurs.

In an exemplary embodiment of the present disclosure, the processor may evaluate reliability of the backed-up data and may determine whether to use the backed-up data, based on a driving situation and the evaluated reliability, after performing each reset.

In an exemplary embodiment of the present disclosure, the processor may back up data for the application in which the failure occurs to a volatile or non-volatile memory, before performing the reset for the application in which the failure occurs and the reset for the OS about the application in which the failure occurs and may back up data for the application in which the failure occurs to the non-volatile memory, before performing the reset for the controller about the application in which the failure occurs.

According to another aspect of the present disclosure, a method for controlling to cope with a failure in an autonomous driving system may include determining, by a processor, whether a failure in one or more applications for performing a function about autonomous driving occurs and sequentially performing, by the processor, step-by-step failure response control corresponding to a safety rating of the application in which the failure occurs, when the failure in the application occurs.

In an exemplary embodiment of the present disclosure, the sequential performing of the step-by-step failure response control by the processor may include resetting, by the processor, a portion of the autonomous driving system, associated with the application in which the failure occurs, step by step.

In an exemplary embodiment of the present disclosure, the resetting of the portion of the autonomous driving system, associated with the application in which the failure occurs, step by step by the processor may include stopping, by the processor, resetting the portion of the autonomous driving system, when the application in which the failure occurs is recovered while resetting the portion of the autonomous driving system step by step and normally operating the application in which the failure occurs.

In an exemplary embodiment of the present disclosure, the sequential performing of the step-by-step failure response control by the processor may include sequentially performing, by the processor, the step-by-step failure response control, including a reset for the application in which the failure occurs, a reset for an operation system (OS) about the application in which the failure occurs, and a reset for a controller about the application in which the failure occurs, in a predetermined order.

In an exemplary embodiment of the present disclosure, the method may further include backing up, by the processor, data for the application in which the failure occurs before performing each reset.

In an exemplary embodiment of the present disclosure, the resetting of the portion of the autonomous driving system, associated with the application in which the failure occurs, step by step by the processor may include delivering, by the processor, data before resetting the application in which the failure occurs and an error occurrence code for the failure to another application in which the failure does not occur, when there is a request to deliver data between the application in which the failure occurs and another application while resetting the application in which the failure occurs.

In an exemplary embodiment of the present disclosure, the determining of whether the failure occurs by the processor may include determining, by the processor, a failure in the one or more applications, based on at least one of whether the application is enabled, whether running of the application is greater than a time limit, a logic execution order, an order of execution of a task with dependence, or whether there is data synchronization.

In an exemplary embodiment of the present disclosure, the resetting of the portion of the autonomous driving system, associated with the application in which the failure occurs, step by step by the processor may include resetting, by the processor, the portion of the autonomous driving system step by step in accordance with a number of resets corresponding to the safety rating.

In an exemplary embodiment of the present disclosure, the method may further include evaluating, by the processor, reliability of the backed-up data and determining, by the processor, whether to use the backed-up data, based on a driving situation and the evaluated reliability, after performing each reset.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3 is a drawing illustrating an automotive safety integrity level (ASIL) rating table used in an exemplary embodiment of the present disclosure;

Figure 1:
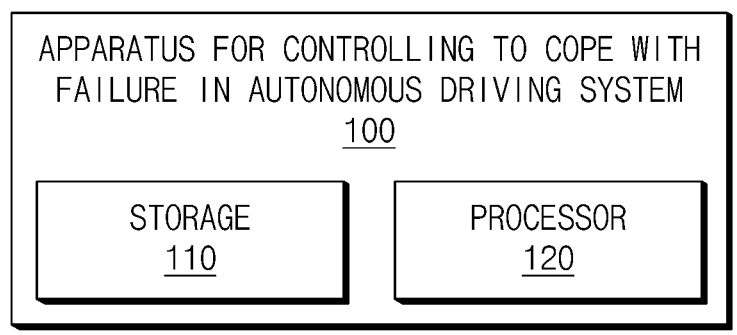
FIG. 1 is a block diagram illustrating an apparatus of controlling to cope with a failure in an autonomous driving system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

In describing the components of the exemplary embodiment according to an exemplary embodiment of the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various embodiments of the present disclosure will be described in detail with reference to FIGS. 1 to 6.

FIG. 1 is a block diagram illustrating an apparatus of controlling to cope with a failure in an autonomous driving system according to an exemplary embodiment of the present disclosure.

An apparatus 100 for controlling to cope with a failure in an autonomous driving system according to an exemplary embodiment of the present disclosure may be implemented inside or outside a vehicle. In the instant case, the apparatus 100 for controlling to cope with the failure in the autonomous driving system may be integrally configured with control units in the vehicle or may be implemented as a separate hardware device to be connected to the control units of the vehicle by a connection means.

As an exemplary embodiment of the present disclosure, the apparatus 100 for controlling to cope with the failure in the autonomous driving system may be integrally configured with the vehicle or may be implemented as a configuration independent of the vehicle in a form of being installed/attached to the vehicle. Alternatively, a portion of the apparatus 100 for controlling to cope with the failure in the autonomous driving system may be integrally configured with the vehicle or the other may be implemented as a configuration independent of the vehicle in a form of being installed/attached to the vehicle.

Referring to FIG. 1, the apparatus 100 for controlling to cope with the failure in the autonomous driving system may include a storage 110 and a processor 120.

As an exemplary embodiment of the present disclosure, the storage 110 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

As an exemplary embodiment of the present disclosure, the storage 110 may store data, an algorithm, and/or the like necessary for an operation of the processor 120.

The storage 110 may store information related to a predetermined safety rating for one or more applications which perform a function about autonomous driving.

Herein, the safety rating may include an automotive safety integrity level (ASIL).

The ASIL refers to unique risk classification for an automotive system or a component of the automotive system. An ASIL rating may be determined according to severity, exposure, and controllability.

The ASIL rating will be described in detail below with reference to FIG. 3.

The processor 120 may be electrically connected to the storage 110 or the like and may electrically control the respective components. The processor 120 may be an electrical circuit which executes instructions of software and may perform a variety of data processing and determination described below. The processor 120 may be, for example, an electronic control unit (ECU), a micro controller unit (MCU), or another sub-controller, which is loaded into the vehicle.

The processor 120 may be connected to the storage 110 to control to read and write data.

Furthermore, the processor 120 may manage, control, or monitor an application in a form of software and/or hardware, which is included in the autonomous driving system.

As an exemplary embodiment of the present disclosure, the application which performs a function about the autonomous driving system may include a forward collision assist (FCA) application, a map data preprocessing application, and the like.

The processor 120 may determine whether a failure in the application occurs.

As an exemplary embodiment of the present disclosure, the processor 120 may determine a failure in one or more applications based on at least one of whether the application is enabled, whether running of the application is greater than a time limit, a logic execution order, an order of execution of a task with dependence, or whether there is data synchronization.

As an exemplary embodiment of the present disclosure, the processor 120 may include one or more logics for determining at least one of whether the application is enabled, whether running of the application is greater than a time limit, a logic execution order, an order of execution of a task with dependence, or whether there is data synchronization.

As an exemplary embodiment of the present disclosure, when the application is not enabled after a command to enable the application is input, the processor 120 may determine that a failure or an error occurs in the application.

As an exemplary embodiment of the present disclosure, when the running of the application is not completed within a predetermined time limit after a command to run the application is input, the processor 120 may determine that a failure or an error occurs in the application.

As an exemplary embodiment of the present disclosure, when it is determined that an order of logic for performing a function of the application is abnormal, the processor 120 may determine that a failure or an error occurs in the application.

As an exemplary embodiment of the present disclosure, when it is determined that an order of execution of a task with dependence is executed differently from an order according to dependence, the processor 120 may determine that a failure or an error occurs in the application.

As an exemplary embodiment of the present disclosure, when synchronization of the application is not normally performed, the processor 120 may determine that a failure or an error occurs in the application.

When the failure in the application occurs, the processor 120 may sequentially perform step-by-step failure response control corresponding to a safety rating of the application in which the failure occurs.

As an exemplary embodiment of the present disclosure, the failure response control may include control for resetting a portion of a system about the application and attempting to recover the system.

As an exemplary embodiment of the present disclosure, the processor 120 may reset a portion of the autonomous driving system, associated with the application in which the failure occurs, step by step.

In the process, the processor 120 may expand a target to be reset, in accordance with a predetermined step to reset the expanded target.

As an exemplary embodiment of the present disclosure, the processor 120 may sequentially perform step-by-step failure response control, including a reset for the application in which the failure occurs, a reset for an operation system (OS) about the application in which the failure occurs, and a reset for a controller about the application in which the failure occurs, in a predetermined order.

As an exemplary embodiment of the present disclosure, when the application in which the failure occurs is not recovered after resetting the application which the failure occurs, the processor 120 may reset an OS about the application in which the failure occurs in a next step.

As an exemplary embodiment of the present disclosure, when the application in which the failure occurs is not recovered after resetting the OS about the application which the failure occurs, the processor 120 may reset a controller about the application in which the failure occurs in a next step.

As an exemplary embodiment of the present disclosure, when the application in which the failure occurs is recovered while resetting a portion of the autonomous driving system step by step, the processor 120 may stop resetting the portion of the autonomous driving system and may normally run the application in which the failure occurs.

The processor 120 may identify that the application is recovered in real time. When the recovery succeeds, the processor 120 may normally run the application again and may rapidly and normally recover an autonomous driving function.

As an exemplary embodiment of the present disclosure, the processor 120 may back up data for the application in which the failure occurs, before performing each reset.

As an exemplary embodiment of the present disclosure, before resetting a reset target for each step, the processor 120 may back up data for the application in which the failure occurs to a non-volatile memory or a volatile memory.

As an exemplary embodiment of the present disclosure, by backing up data for the application, the processor 120 may shorten a time taken to reset and wake up the application.

As an exemplary embodiment of the present disclosure, the processor 120 may back up data for the application which the failure occurs to a volatile or non-volatile memory before performing the reset for the application in which the failure occurs and the reset for the OS about the application in which the failure occurs and may back up data for the application in which the failure occurs to the non-volatile memory before performing the reset for the controller about the application in which the failure occurs.

When backing up the data to the volatile memory before performing the reset for the controller about the application in which the failure occurs, because the data stored in the volatile memory is volatilized in a process of resetting controller hardware, the processor 120 may back up data for the application in which the failure occurs to the non-volatile memory, before performing the reset for the controller about the application in which the failure occurs.

As an exemplary embodiment of the present disclosure, the processor 120 may evaluate reliability of the backed-up data and may determine whether to use the backed-up data, based on a driving situation after performing each reset and the evaluated reliability.

As an exemplary embodiment of the present disclosure, the processor 120 may determine whether to use the backed-up data, based on whether the driving situation is a situation suitable for using the backed-up data, in accordance with a predetermined criterion.

As an exemplary embodiment of the present disclosure, the processor 120 may determine reliability of the backed-up data using any technology such as a block code, a convolution code, a parity code, or a combination thereof, which is disposed in the backed-up data, and may determine whether to use the backed-up data based on the determined reliability.

As an exemplary embodiment of the present disclosure, when there is a request to deliver data between the application in which the failure occurs and another application in which the failure does not occur while resetting the application in which the failure occurs, the processor 120 may deliver data before the reset is performed and an error occurrence code for the failure to the other application.

When the other application in which the failure does not occur is linked to the application in which the failure occurs to perform a function, it may need data of the application in which the failure occurs.

In the instant case, the processor 120 may deliver data of the application in which the failure occurs before the reset is performed to the other application in which the failure does not occur so that the other application in which the failure does not occur may perform a function.

Furthermore, the processor 120 may deliver an error occurrence code for the failure in the application in which the failure occurs to the other application in which the failure does not occur so that the other application in which the failure does not occur may recognize a situation where the application in which the failure occurs fails and may perform control according to it.

As an exemplary embodiment of the present disclosure, the processor 120 may reset a portion of the autonomous driving system step by step in accordance with a number of resets corresponding to the safety rating.

As an exemplary embodiment of the present disclosure, the processor 120 may reset a portion of the autonomous driving system by the number of resets determined according to an ASIL rating of the application in which the failure occurs.

As an exemplary embodiment of the present disclosure, when the ASIL rating of the application is ASIL D, the number of resets may be set to 5 times.

As an exemplary embodiment of the present disclosure, when the ASIL rating of the application is ASIL C, the number of resets may be set to 10 times.

As an exemplary embodiment of the present disclosure, when the ASIL rating of the application is ASIL B, the number of resets may be set to 15 times.

As an exemplary embodiment of the present disclosure, when the ASIL rating of the application is ASIL A, the number of resets may be set to 20 times.

As an exemplary embodiment of the present disclosure, when the ASIL rating of the application is ASIL QM, the number of resets may be set to 30 times.

Herein, the number of resets according to the ASIL rating may be randomly determined to give an example and may be actually determined as another number.

As an exemplary embodiment of the present disclosure, the higher the ASIL rating of the application (where the ASIL rating is high in an order of ASIL D, ASIL C, ASIL B, ASIL A, and ASIL QM), the less the number of resets may be set.

Thus, the higher the ASIL rating of the application, the shorter the non-operation time and the processing time may become upon occurrence of an error.

As an exemplary embodiment of the present disclosure, when the reset for the application is repeatedly performed, a period when the reset is performed may be set to be the same as a period of an application task. In other words, when the reset is performed one time, the task of the application may be turned off during one time period.

As an exemplary embodiment of the present disclosure, when the application in which the failure occurs is not recovered after performing the step-by-step failure response control, the processor 120 may record a failure code, may deliver a maintenance request to a user, and may end the controller about the application in which the failure occurs.

As an exemplary embodiment of the present disclosure, when the application is not recovered after performing all the reset for the application in which the failure occurs, the reset for the OS about the application in which the failure occurs, and the reset for the controller about the application in which the failure occurs, the processor 120 may record a failure code in a non-volatile memory or a volatile memory, may audibly or visually deliver a maintenance request through a user interface (UI), and may end the controller about the application in which the failure occurs.

Figure 2:
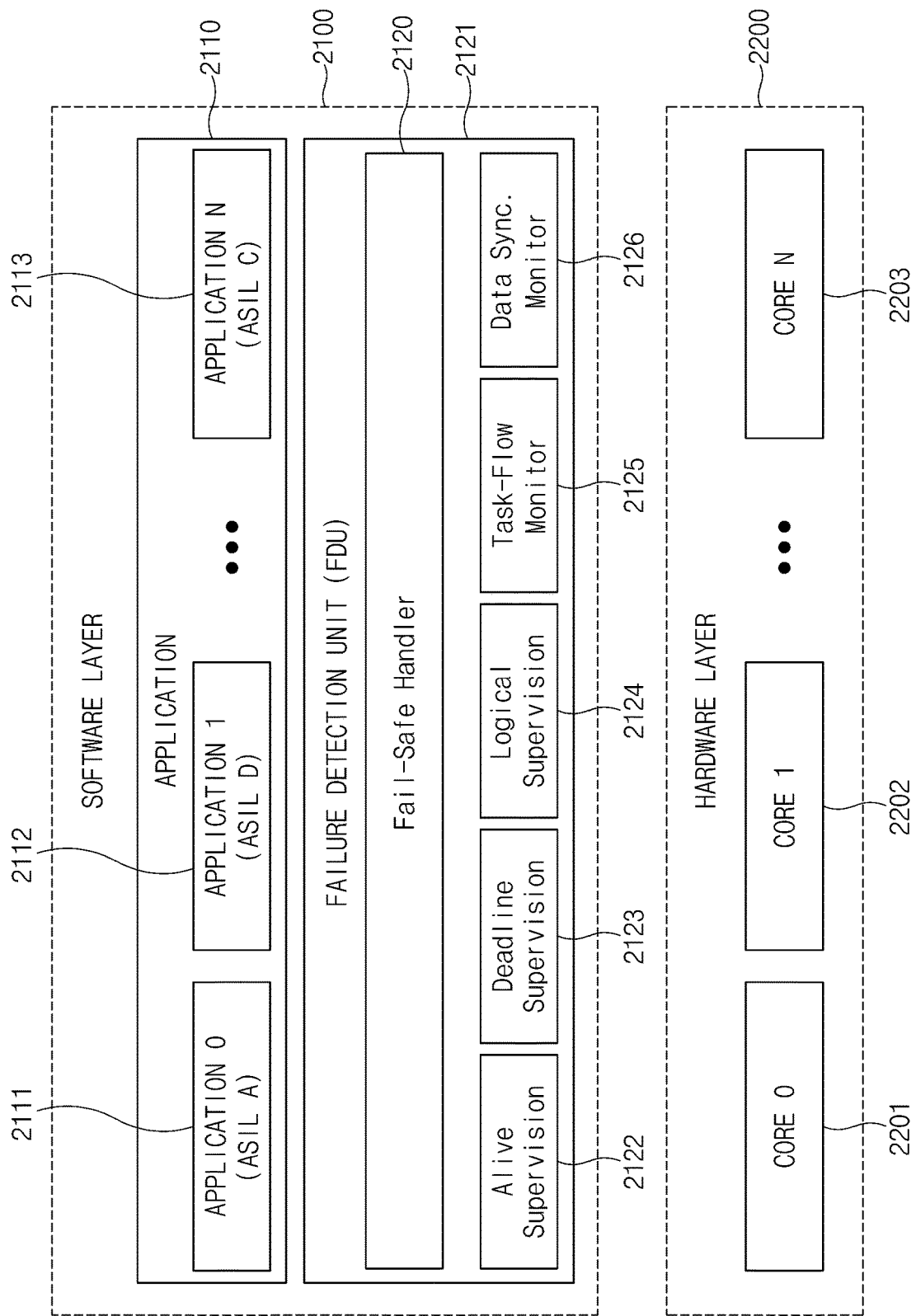
FIG. 2 is a drawing illustrating a detailed configuration of an apparatus of controlling to cope with a failure in an autonomous driving system according to an exemplary embodiment of the present disclosure.

FIG. 2 is a drawing illustrating a detailed configuration of an apparatus of controlling to cope with a failure in an autonomous driving system according to an exemplary embodiment of the present disclosure.

Referring to FIG. 2, the autonomous driving system may be divided into a software layer 2100 and a hardware layer 2200.

The software layer 2100 may include an application 2110 and a failure detection unit (FDU) 2120.

Herein, a processor 120 of FIG. 1 may be configured including the FDU 2120.

The application 2110 may include application 0 2111, application 1 2112, and application N 2113.

An ASIL rating may be determined in each application 2110, based on severity, exposure, and controllability for failure.

As an exemplary embodiment of the present disclosure, an ASIL rating may be determined so that application 0 2111 is ASIL A, application 1 2112 is ASIL D, and application N 2113 is ASIL C.

The FDU 2120 may include a fail-safe handler 2121, an alive supervision 2122, a deadline supervision 2123, a logical supervision 2124, a task-flow monitor 2125, and a data synchronization monitor 2126.

The FDU 2120 may detect an error in the application 2110 and may perform failure response control according to an ASIL rating of an application in which a failure occurs.

The fail-safe handler 2121 may determine and control an operation of an autonomous driving application, based on whether the application is normal or whether there is an error in the application, which is determined from the alive supervision 2122, the deadline supervision 2123, the logical supervision 2124, the task-flow monitor 2125, and the data synchronization monitor 2126.

The alive supervision 2122 may monitor whether the application is enabled.

When the application is not enabled after a command to enable the application is input, the alive supervision 2122 may determine that a failure or an error occurs in the application.

When a command to run the application is input, the deadline supervision 2123 may determine whether the running of the application is completed within a predetermined time limit. When the running of the application is not completed, the deadline supervision 2123 may determine that a failure or an error occurs in the application.

The logical supervision 2124 may monitor an order of logic performed for a function of the application. When the order of the logic for performing the function of the application is determined as being abnormal, the logical supervision 2124 may determine that a failure or an error occurs in the application.

The task-flow monitor 2125 may monitor whether an order of execution of a task with dependence is executed differently from an order according to the dependence. When the order of execution of the task with the dependence is executed differently from the order according to the dependence, the task-flow monitor 2125 may determine that a failure or an error occurs in the application.

The data synchronization monitor 2126 may monitor whether there is data synchronization. When synchronization of the application is not normally performed, the data synchronization monitor 2126 may determine that a failure or an error occurs in the application.

The hardware layer 2200 may include one or more cores such as core 0 2201, core 1 2202, and core N 2203.

Each core may run one or more applications.

Data and/or an algorithm necessary for a process of performing one or more applications may be stored in each core and a processor for performing the stored algorithm may be included in each core.

FIG. 3 is a drawing illustrating an automotive safety integrity level (ASIL) rating table used in an exemplary embodiment of the present disclosure.

Referring to FIG. 3, an ASIL rating may be determined according to severity, exposure, and controllability.

As an exemplary embodiment of the present disclosure, light and moderate injuries may be classified as severity in step S1.

As an exemplary embodiment of the present disclosure, severe and life threatening injuries-survival probable may be classified as severity in step S2.

As an exemplary embodiment of the present disclosure, life threatening injuries (survival uncertain) or fatal injuries may be classified as severity in step S3.

As an exemplary embodiment of the present disclosure, when the frequency is about less than once a year, it may be classified as a frequency in step E1.

As an exemplary embodiment of the present disclosure, when the frequency occurs about several times a year, it may be classified as a frequency in step E2.

As an exemplary embodiment of the present disclosure, when the frequency occurs about once a month, it may be classified as a frequency in step E3.

As an exemplary embodiment of the present disclosure, when the frequency occurs almost every time you drive, it may be classified as a frequency in step E4.

As an exemplary embodiment of the present disclosure, a simple and controllable risk that all drivers may avoid may be classified as controllability in step C1.

As an exemplary embodiment of the present disclosure, a generally controllable risk that 90% of drivers may avoid may be classified as controllability in step C2.

As an exemplary embodiment of the present disclosure, a risk that about less than 90% of drivers may avoid, which is difficult to control or out of control, may be classified as controllability in step C3.

An ASIL rating of the application may be determined as one of ratings including ASIL QM, ASIL A, ASIL B, ASIL C, and ASIL D, based on severity, exposure, and controllability according to the function.

As an exemplary embodiment of the present disclosure, an application for performing an FCA function may be determined as an ASIL D rating, and an application for performing a map data preprocessing function may be determined as an ASIL QM rating.

The application may require a function safety mechanism with high robustness in an ascending order of ASIL QM, ASIL A, ASIL B, ASIL C, and ASIL D.

As an exemplary embodiment of the present disclosure, an application for performing an important function for safety of a driver and a pedestrian, for example, an FCA function which is one of autonomous driving functions complying with the ASIL D rating may receive a request for a more robust operation in a non-operation time, in processing upon occurrence of an error, and the like.

Figure 4A:
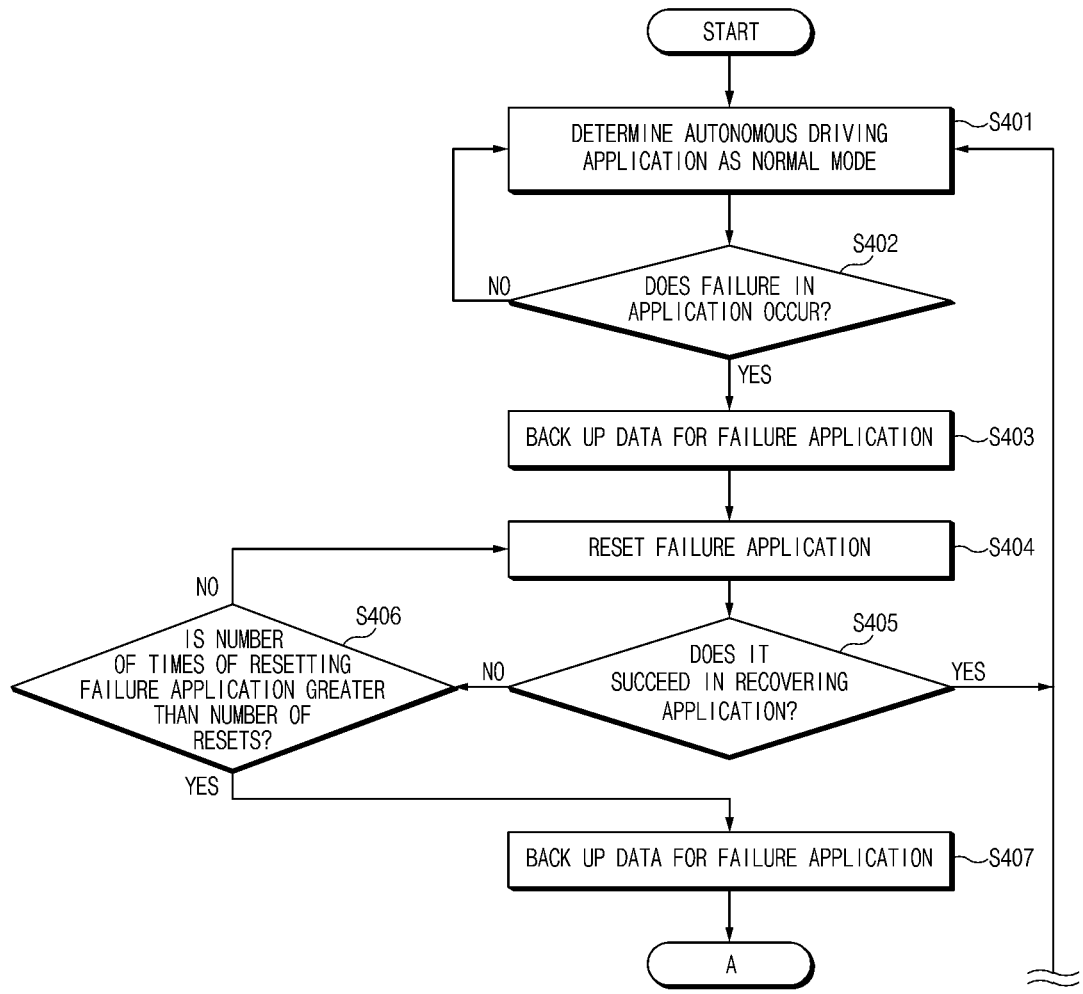
FIG. 4A and FIG. 4B are flowcharts illustrating an operation of an apparatus of controlling to cope with a failure in an autonomous driving system according to an exemplary embodiment of the present disclosure.
Figure 4B:
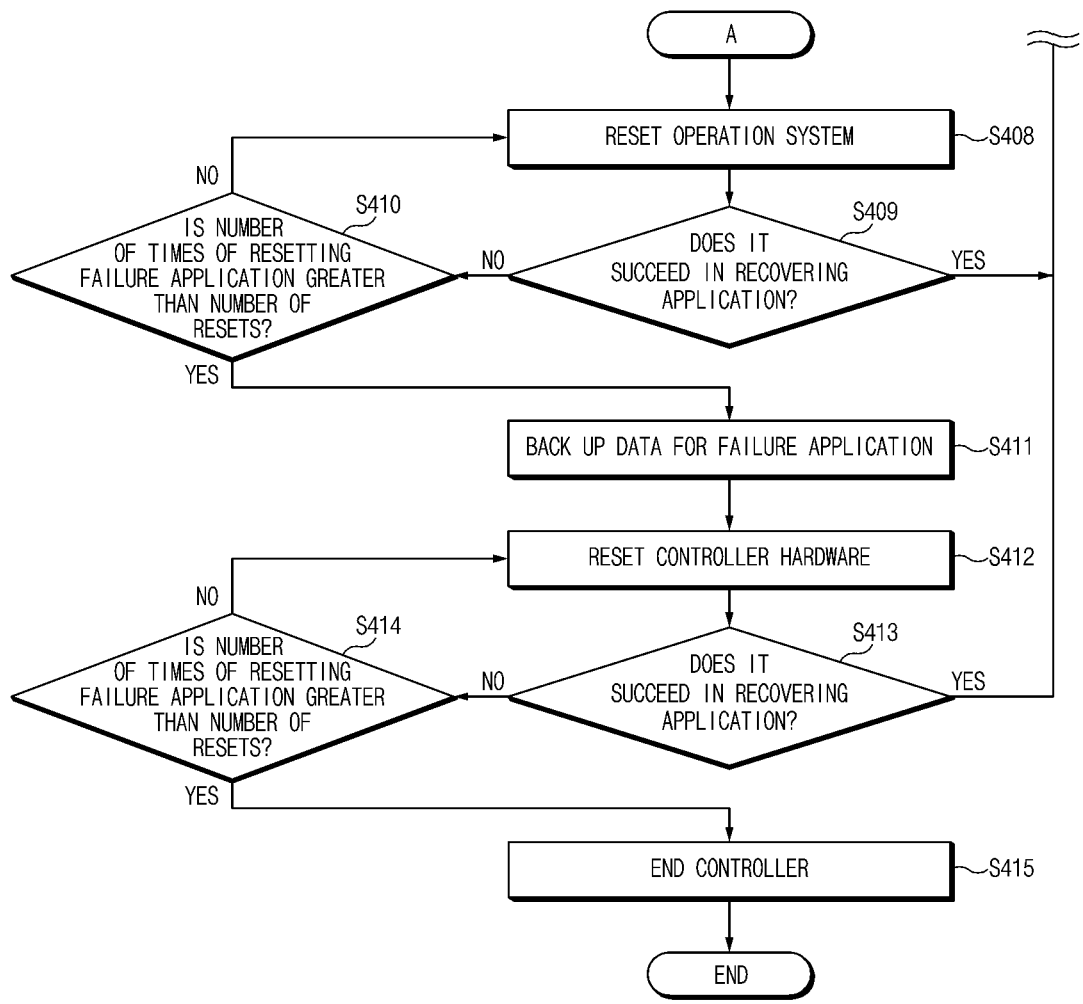

FIG. 4A and FIG. 4B are flowcharts illustrating an operation of an apparatus of controlling to cope with a failure in an autonomous driving system according to an exemplary embodiment of the present disclosure.

Hereinafter, it is assumed that an apparatus 100 for controlling to cope with a failure in an autonomous driving system in FIG. 1 performs a process of FIG. 4A and FIG. 4B. Furthermore, in a description of FIG. 4A and FIG. 4B, an operation referred to as being performed by the apparatus 100 for controlling to cope with the failure in the autonomous driving system may be understood as being controlled by a processor 120 of the apparatus 100 for controlling to cope with the failure in the autonomous driving system.

Referring to FIG. 4A, in S401, the apparatus 100 for controlling to cope with the failure in the autonomous driving system may initially determine an autonomous driving application as a normal mode.

After determining the autonomous driving application as the normal mode in S401, in S402, the apparatus 100 for controlling to cope with the failure in the autonomous driving system may identify whether a failure in the application occurs.

As an exemplary embodiment of the present disclosure, the apparatus 100 for controlling to cope with the failure in the autonomous driving system may identify whether a failure in the application occurs, based on at least one of whether the application is enabled, whether running of the application is greater than a time limit, a logic execution order, an order of execution of a task with dependence, or whether there is data synchronization.

After identifying whether the failure in the application occurs in S402, when it is identified that the failure in the application does not occur, the apparatus 100 for controlling to cope with the failure in the autonomous driving system may return to S401 to determine the application as the normal mode.

After identifying whether the failure in the application occurs in S402, when it is identified that the failure in the application occurs, in S403, the apparatus 100 for controlling to cope with the failure in the autonomous driving system may back up data for the failure application.

As an exemplary embodiment of the present disclosure, the apparatus 100 for controlling to cope with the failure in the autonomous driving system may back up data for the failure application to a non-volatile memory or a volatile memory.

After backing up the data for the failure application in S403, in S404, the apparatus 100 for controlling to cope with the failure in the autonomous driving system may reset the failure application.

As an exemplary embodiment of the present disclosure, in S404, the apparatus 100 for controlling to cope with the failure in the autonomous driving system may sequentially input an IDLE command a RUN command for the failure application and may reset the failure application.

After resetting the failure application in S404, in S405, the apparatus 100 for controlling to cope with the failure in the autonomous driving system may identify whether it succeeds in recovering the application.

After identifying whether it succeeds in recovering the application in S405, when it is identified that it succeeds in recovering the application, the apparatus 100 for controlling to cope with the failure in the autonomous driving system may return to S401 to determine the application as the normal mode.

When it is identified that it succeeds in recovering the application, because the apparatus 100 for controlling to cope with the failure in the autonomous driving system does not attempt to recover the application any longer by the reset, it may determine the application as the normal mode and may operate normally the application.

After identifying whether it succeeds in recovering the application in S405, when it is identified that it does not succeed in recovering the application, in S406, the apparatus 100 for controlling to cope with the failure in the autonomous driving system may identify whether the number of times of resetting the failure application is greater than the number of resets.

Herein, the number of resets may be the number of resets of the application, which is determined in response to an ASIL rating of the application in which the failure occurs.

After identifying whether the number of times of resetting the failure application is greater than the number of resets in S406, when it is identified that the number of times of resetting the failure application is not greater than the number of resets, the apparatus 100 for controlling to cope with the failure in the autonomous driving system may return to S404 to reset the failure application.

After identifying whether the number of times of resetting the failure application is greater than the number of resets in S406, when it is identified that the number of times of resetting the failure application is greater than the number of resets, in S407, the apparatus 100 for controlling to cope with the failure in the autonomous driving system may back up data for the failure application.

As an exemplary embodiment of the present disclosure, the apparatus 100 for controlling to cope with the failure in the autonomous driving system may back up data for the failure application to a non-volatile memory or a volatile memory.

After backing up the data for the failure application in S407, in S408, the apparatus 100 for controlling to cope with the failure in the autonomous driving system may reset an OS about the application in which the failure occurs.

After resetting the OS about the application in which the failure occurs in S408, in S409, the apparatus 100 for controlling to cope with the failure in the autonomous driving system may identify whether it succeeds in recovering the application.

After identifying whether it succeeds in recovering the application in S409, when it is identified that it succeeds in recovering the application, the apparatus 100 for controlling to cope with the failure in the autonomous driving system may return to S401 to determine the application as the normal mode.

After identifying whether it succeeds in recovering the application in S409, when it is identified that it does not succeed in recovering the application, in S410, the apparatus 100 for controlling to cope with the failure in the autonomous driving system may identify whether the number of times of resetting the OS about the application in which the failure occurs is greater than the number of resets.

Herein, the number of resets may be the number of resets of the OS, which is determined in response to an ASIL rating of the application in which the failure occurs.

After identifying whether the number of times of resetting the OS about the application in which the failure occurs is greater than the number of resets in S410, when it is identified that the number of times of resetting the OS about the application in which the failure occurs is not greater than the number of resets, the apparatus 100 for controlling to cope with the failure in the autonomous driving system may return to S408 to reset the OS about the application in which the failure occurs.

After identifying whether the number of times of resetting the OS about the application in which the failure occurs is greater than the number of resets in S410, when it is identified that the number of times of resetting the OS about the application in which the failure occurs is greater than the number of resets, in S411, the apparatus 100 for controlling to cope with the failure in the autonomous driving system may back up data for the failure application.

As an exemplary embodiment of the present disclosure, the apparatus 100 for controlling to cope with the failure in the autonomous driving system may back up data for the failure application to the non-volatile memory.

After backing up the data for the failure application in S411, in S412, the apparatus 100 for controlling to cope with the failure in the autonomous driving system may reset controller hardware about the application in which the failure occurs.

As an exemplary embodiment of the present disclosure, the apparatus 100 for controlling to cope with the failure in the autonomous driving system may reset an ECU.

After resetting the controller hardware about the application in which the failure occurs in S412, in S413, the apparatus 100 for controlling to cope with the failure in the autonomous driving system may identify whether it succeeds in recovering the application.

After identifying whether it succeeds in recovering the application in S413, when it is identified that it succeeds in recovering the application, the apparatus 100 for controlling to cope with the failure in the autonomous driving system may return to S401 to determine the application as the normal mode.

After identifying whether it succeeds in recovering the application in S413, when it is identified that it does not succeed in recovering the application, in S414, the apparatus 100 for controlling to cope with the failure in the autonomous driving system may identify whether the number of times of resetting the controller hardware about the application in which the failure occurs is greater than the number of resets.

Herein, the number of resets may be the number of resets of the controller, which is determined in response to an ASIL rating of the application in which the failure occurs.

After identifying whether the number of times of resetting the controller hardware about the application in which the failure occurs is greater than the number of resets in S414, when it is identified that the number of times of resetting the controller hardware about the application in which the failure occurs is not greater than the number of resets, the apparatus 100 for controlling to cope with the failure in the autonomous driving system may return to S412 to reset the controller hardware about the application in which the failure occurs.

After identifying whether the number of times of resetting the controller hardware about the application in which the failure occurs is greater than the number of resets in S414, when it is identified that the number of times of resetting the controller hardware about the application in which the failure occurs is greater than the number of resets, in S415, the apparatus 100 for controlling to cope with the failure in the autonomous driving system may end the controller.

As an exemplary embodiment of the present disclosure, when an error in the application occurs after repeatedly resetting the controller hardware, the apparatus 100 for controlling to cope with the failure in the autonomous driving system may record a diagnostic trouble code (DTC) in a memory and may end a power source of the ECU.

Figure 5:
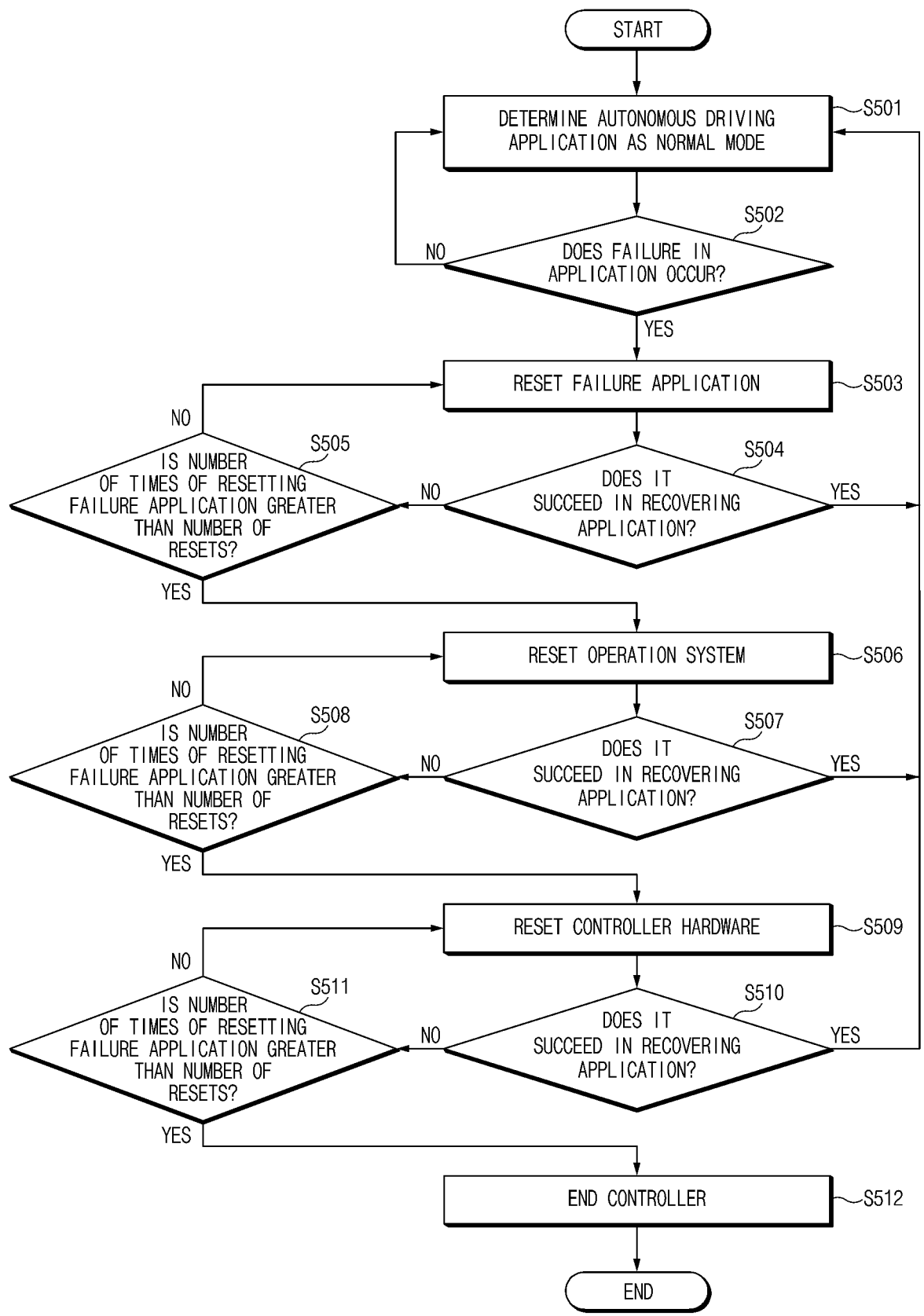
FIG. 5 is a flowchart illustrating an operation of an apparatus of controlling to cope with a failure in an autonomous driving system according to another exemplary embodiment of the present disclosure.

FIG. 5 is a flowchart illustrating an operation of an apparatus of controlling to cope with a failure in an autonomous driving system according to another exemplary embodiment of the present disclosure.

Hereinafter, it is assumed that an apparatus 100 for controlling to cope with a failure in an autonomous driving system in FIG. 1 performs a process of FIG. 5. Furthermore, in a description of FIG. 5, an operation referred to as being performed by the apparatus 100 for controlling to cope with the failure in the autonomous driving system may be understood as being controlled by a processor 120 of the apparatus 100 for controlling to cope with the failure in the autonomous driving system.

Referring to FIG. 5, in S501, the apparatus 100 for controlling to cope with the failure in the autonomous driving system may initially determine an autonomous driving application as a normal mode.

After determining the autonomous driving application as the normal mode in S501, in S502, the apparatus 100 for controlling to cope with the failure in the autonomous driving system may identify whether a failure in the application occurs.

Because the process in S502 is the same as a process in S402 of FIG. 4A, a detailed description thereof will be omitted.

After identifying whether the failure in the application occurs in S502, when it is identified that the failure in the application does not occur, the apparatus 100 for controlling to cope with the failure in the autonomous driving system may return to S501 to determine the application as the normal mode.

After identifying whether the failure in the application occurs in S502, when it is identified that the failure in the application occurs, in S503, the apparatus 100 for controlling to cope with the failure in the autonomous driving system may reset the failure application.

Because the process in S503 is the same as a process in S404 of FIG. 4A, a detailed description thereof will be omitted.

After resetting the failure application in S503, in S504, the apparatus 100 for controlling to cope with the failure in the autonomous driving system may identify whether it succeeds in recovering the application.

After identifying whether it succeeds in recovering the application in S504, when it is identified that it succeeds in recovering the application, the apparatus 100 for controlling to cope with the failure in the autonomous driving system may return to S501 to determine the application as the normal mode.

After identifying whether it succeeds in recovering the application in S504, when it is identified that it does not succeed in recovering the application, in S505, the apparatus 100 for controlling to cope with the failure in the autonomous driving system may identify whether the number of times of resetting the failure application is greater than the number of resets.

Herein, the number of resets may be the number of resets of the application, which is determined in response to an ASIL rating of the application in which the failure occurs.

After identifying whether the number of times of resetting the failure application is greater than the number of resets in S505, when it is identified that the number of times of resetting the failure application is not greater than the number of resets, the apparatus 100 for controlling to cope with the failure in the autonomous driving system may return to S503 to reset the failure application.

After identifying whether the number of times of resetting the failure application is greater than the number of resets in S505, when it is identified that the number of times of resetting the failure application is greater than the number of resets, in S506, the apparatus 100 for controlling to cope with the failure in the autonomous driving system may reset an OS about the application in which the failure occurs.

After resetting the OS about the application in which the failure occurs in S506, in S507, the apparatus 100 for controlling to cope with the failure in the autonomous driving system may identify whether it succeeds in recovering the application.

After identifying whether it succeeds in recovering the application in S507, when it is identified that it succeeds in recovering the application, the apparatus 100 for controlling to cope with the failure in the autonomous driving system may return to S501 to determine the application as the normal mode.

After identifying whether it succeeds in recovering the application in S507, when it is identified that it does not succeed in recovering the application, in S508, the apparatus 100 for controlling to cope with the failure in the autonomous driving system may identify whether the number of times of resetting the OS about the application in which the failure occurs is greater than the number of resets.

Herein, the number of resets may be the number of resets of the OS, which is determined in response to an ASIL rating of the application in which the failure occurs.

After identifying whether the number of times of resetting the OS about the application in which the failure occurs is greater than the number of resets in S508, when it is identified that the number of times of resetting the OS about the application in which the failure occurs is not greater than the number of resets, the apparatus 100 for controlling to cope with the failure in the autonomous driving system may return to S506 to reset the OS about the application in which the failure occurs.

After identifying whether the number of times of resetting the OS about the application in which the failure occurs is greater than the number of resets in S508, when it is identified that the number of times of resetting the OS about the application in which the failure occurs is greater than the number of resets, in S509, the apparatus 100 for controlling to cope with the failure in the autonomous driving system may reset controller hardware about the application in which the failure occurs.

Because the process in S509 is the same as a process in S412 of FIG. 4B a detailed description thereof will be omitted.

After resetting the controller hardware about the application in which the failure occurs in S509, in S510, the apparatus 100 for controlling to cope with the failure in the autonomous driving system may identify whether it succeeds in recovering the application.

After identifying whether it succeeds in recovering the application in S510, when it is identified that it succeeds in recovering the application, the apparatus 100 for controlling to cope with the failure in the autonomous driving system may return to S501 to determine the application as the normal mode.

After identifying whether it succeeds in recovering the application in S510, when it is identified that it does not succeed in recovering the application, in S511, the apparatus 100 for controlling to cope with the failure in the autonomous driving system may identify whether the number of times of resetting the controller hardware about the application in which the failure occurs is greater than the number of resets.

Herein, the number of resets may be the number of resets of the controller, which is determined in response to an ASIL rating of the application in which the failure occurs.

After identifying whether the number of times of resetting the controller hardware about the application in which the failure occurs is greater than the number of resets in S511, when it is identified that the number of times of resetting the controller hardware about the application in which the failure occurs is not greater than the number of resets, the apparatus 100 for controlling to cope with the failure in the autonomous driving system may return to S509 to reset the controller hardware about the application in which the failure occurs.

After identifying whether the number of times of resetting the controller hardware about the application in which the failure occurs is greater than the number of resets in S511, when it is identified that the number of times of resetting the controller hardware about the application in which the failure occurs is greater than the number of resets, in S512, the apparatus 100 for controlling to cope with the failure in the autonomous driving system may end the controller.

Because the process in S512 is the same as a process in S415 of FIG. 4B, a detailed description thereof will be omitted.

Figure 6:
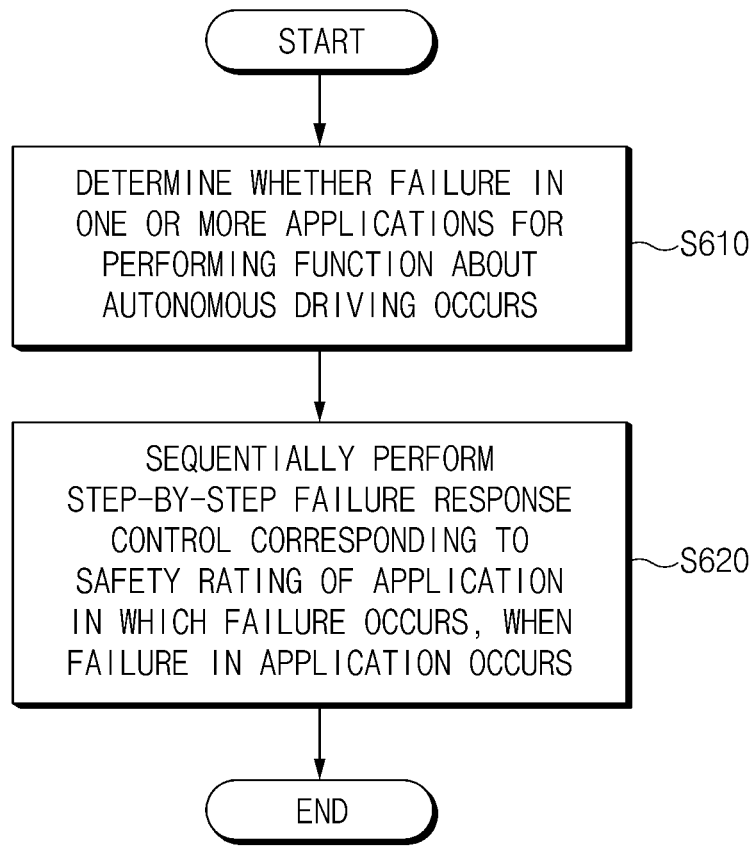
FIG. 6 is a flowchart illustrating a method for controlling to cope with a failure in an autonomous driving system according to an exemplary embodiment of the present disclosure.

FIG. 6 is a flowchart illustrating a method for controlling to cope with a failure in an autonomous driving system according to an exemplary embodiment of the present disclosure.

Referring to FIG. 6, the method for controlling to cope with the failure in the autonomous driving system may include determining (S610) whether a failure in one or more applications for performing a function about autonomous driving occurs and sequentially performing (S620) step-by-step failure response control corresponding to a safety rating of the application in which the failure occurs, when the failure in the application occurs.

The determining (S610) of whether the failure in the one or more applications for performing the function about the autonomous driving occurs may be performed by a processor 120 of FIG. 1.

As an exemplary embodiment of the present disclosure, the determining (S610) of whether the failure in the one or more applications for performing the function about the autonomous driving occurs may include determining, by the processor 120, the failure in the one or more applications, based on at least one of whether the application is enabled, whether running of the application is greater than a time limit, a logic execution time, an order of execution of a task with dependence, or whether there is data synchronization.

The sequential performing (S620) of the step-by-step failure response control corresponding to the safety rating of the application in which the failure occurs, when the failure in the application occurs, may be performed by the processor 120.

As an exemplary embodiment of the present disclosure, the sequential performing (S620) of the step-by-step failure response control corresponding to the safety rating of the application in which the failure occurs, when the failure in the application occurs, may include resetting, by the processor 120, a portion of an autonomous driving system, associated with the application in which the failure occurs, step by step.

As an exemplary embodiment of the present disclosure, the resetting of the portion of the autonomous driving system, associated with the application in which the failure occurs, step by step by the processor 120 may include stopping, by the processor 120, resetting the portion of the autonomous driving system, when the application in which the failure occurs is recovered while resetting the portion of the autonomous driving system step by step, and normally operating the application in which the failure occurs.

As an exemplary embodiment of the present disclosure, the sequential performing (S620) of the step-by-step failure response control corresponding to the safety rating of the application in which the failure occurs, when the failure in the application occurs, may include sequentially performing, by the processor 120, the step-by-step failure response control, including a reset for the application in which the failure occurs, a reset for an OS about the application in which the failure occurs, and a reset for a controller about the application in which the failure occurs, in a predetermined order.

As an exemplary embodiment of the present disclosure, the method for controlling to cope with the failure in the autonomous driving system may further include backing up, by the processor 120, data for the application in which the failure occurs before performing each reset.

As an exemplary embodiment of the present disclosure, the resetting of the portion of the autonomous driving system, associated with the application in which the failure occurs, step by step by the processor 120 may include delivering, by the processor 120, data before resetting the application in which the failure occurs and an error occurrence code for the failure to anther application in which the failure does not occur, when there is a request to deliver data between the application in which the failure occurs and another application while resetting the application in which the failure occurs.

As an exemplary embodiment of the present disclosure, the resetting of the portion of the autonomous driving system, associated with the application in which the failure occurs, step by step by the processor 120 may include resetting, by the processor 120, the portion of the autonomous driving system in accordance, in accordance with the number of resets corresponding to a safety rating, step by step.

As an exemplary embodiment of the present disclosure, the method for controlling to cope with the failure in the autonomous driving system may further include evaluating, by the processor 120, reliability of the backed-up data and determining, by the processor 120, whether to use the backed-up data, based on a driving situation after performing each reset and the evaluated reliability.

The operations of the method or the algorithm described in connection with the exemplary embodiments included herein may be embodied directly in hardware or a software module executed by the processor or in a combination thereof. The software module may reside on a storage medium (that is, the memory/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

A description will be provided of effects of the apparatus of controlling to cope with the failure in the autonomous driving system and the method thereof according to an exemplary embodiment of the present disclosure.

According to at least one of embodiments of the present disclosure, the apparatus and the method thereof may be provided to cope with when an error in an application of an autonomous driving system occurs.

Furthermore, according to at least one of embodiments of the present disclosure, the apparatus of controlling to cope with the failure in the autonomous driving system and the method thereof may be provided to stably provide an autonomous driving service.

Furthermore, according to at least one of embodiments of the present disclosure, the apparatus of controlling to cope with the failure in the autonomous driving system and the method thereof may be provided to prevent reliability of the user for the autonomous driving system from being degraded.

Furthermore, according to at least one of embodiments of the present disclosure, the apparatus of controlling to cope with the failure in the autonomous driving system and the method thereof may be provided to respond to a situation where some applications fail, although various autonomous driving applications are integrated into one integrated controller.

Furthermore, according to at least one of embodiments of the present disclosure, the apparatus of controlling to cope with the failure in the autonomous driving system and the method thereof may be provided to provide a driver with an available service during a longer time, upon a situation where some autonomous driving applications fail.

Furthermore, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of controlling to cope with failures in an autonomous driving system, the apparatus comprising:
    a storage configured for storing information related to a predetermined safety rating for one or more applications which perform a function about autonomous driving; and
    a processor configured to determine whether a failure in an application among the one or more applications occurs and sequentially perform step-by-step failure response control corresponding to a safety rating of the application in which the failure occurs, when the failure in the application occurs,
    wherein the processor is configured to:
        reset a portion of the autonomous driving system, associated with the application in which the failure occurs, step by step, and
        reset the portion of the autonomous driving system step by step, in accordance with a number of resets corresponding to the safety rating.

2. The apparatus of claim 1, wherein the processor is configured to stop resetting the portion of the autonomous driving system, when the application in which the failure occurs is recovered while resetting the portion of the autonomous driving system step by step and to operate normally the application in which the failure occurs.

3. The apparatus of claim 1, wherein the processor is configured to sequentially perform the step-by-step failure response control, including a reset for the application in which the failure occurs, a reset for an operation system (OS) about the application in which the failure occurs, and a reset for a controller about the application in which the failure occurs, in a predetermined order.

4. The apparatus of claim 3, wherein the processor is configured to back up data for the application in which the failure occurs to a volatile or non-volatile memory, before performing the reset for the application in which the failure occurs and the reset for the OS about the application in which the failure occurs and to back up data for the application in which the failure occurs to the non-volatile memory, before performing the reset for the controller about the application in which the failure occurs.

5. The apparatus of claim 1, wherein the processor is configured to back up data for the application in which the failure occurs before performing each reset.

6. The apparatus of claim 5, wherein the processor is configured to evaluate reliability of the backed-up data and to determine whether to use the backed-up data, based on a driving situation after performing each reset and the evaluated reliability.

7. The apparatus of claim 1, wherein the processor is configured to deliver data before resetting the application in which the failure occurs and an error occurrence code for the failure to another application in which the failure does not occur among the one or more applications, when there is a request to deliver data between the application in which the failure occurs and another application while resetting the application in which the failure occurs.

8. The apparatus of claim 1, wherein the processor is configured to determine the failure in the one or more applications, based on at least one of whether the application is enabled, whether running of the application is greater than a time limit, a logic execution order, an order of execution of a task with dependence, or whether there is data synchronization.

9. The apparatus of claim 1, wherein the processor is configured to record a failure code, when the application in which the failure occurs is not recovered, after performing the step-by-step failure response control, to deliver a maintenance request to a user, and to end a controller about the application in which the failure occurs.

10. A method for controlling to cope with failures in an autonomous driving system, the method comprising:
    determining, by a processor, whether a failure in one or more applications for performing a function about autonomous driving occurs; and sequentially performing, by the processor, step-by-step failure response control corresponding to a safety rating of an application in which the failure occurs among the one or more applications, when the failure in the application occurs, wherein the sequential performing of the step-by-step failure response control by the processor includes:

resetting, by the processor, a portion of the autonomous driving system, associated with the application in which the failure occurs, step by step, and wherein the resetting of the portion of the autonomous driving system, associated with the application in which the failure occurs, step by step by the processor includes:

resetting, by the processor, the portion of the autonomous driving system step by step, depending on a number of resets corresponding to the safety rating.

11. The method of claim 10, wherein the resetting of the portion of the autonomous driving system, associated with the application in which the failure occurs, step by step by the processor includes:

stopping, by the processor, resetting the portion of the autonomous driving system, when the application in which the failure occurs is recovered while resetting the portion of the autonomous driving system step by step and normally operating the application in which the failure occurs.

12. The method of claim 10, wherein the sequential performing of the step-by-step failure response control by the processor includes:

sequentially performing, by the processor, the step-by-step failure response control, including a reset for the application in which the failure occurs, a reset for an operation system (OS) about the application in which the failure occurs, and a reset for a controller about the application in which the failure occurs, in a predetermined order.

13. The method of claim 10, further including:

backing up, by the processor, data for the application in which the failure occurs before performing each reset.

14. The method of claim 13, further including:

evaluating, by the processor, reliability of the backed-up data; and determining, by the processor, whether to use the backed-up data, based on a driving situation after performing each reset and the evaluated reliability.

15. The method of claim 10, wherein the resetting of the portion of the autonomous driving system, associated with the application in which the failure occurs, step by step by the processor includes:

delivering, by the processor, data before resetting the application in which the failure occurs and an error occurrence code for the failure to another application in which the failure does not occur among the one or more applications, when there is a request to deliver data between the application in which the failure occurs and another application while resetting the application in which the failure occurs.

16. The method of claim 10, wherein the determining of whether the failure occurs by the processor includes:

determining, by the processor, the failure in the one or more applications, based on at least one of whether the application is enabled, whether running of the application is greater than a time limit, a logic execution order, an order of execution of a task with dependence, or whether there is data synchronization.

* * * * *